Dec. 19, 1922.
H. C. NEWCOM.
CRANK HANDLE.
FILED MAY 23, 1922.
1,439,018.
2 SHEETS—SHEET 1.
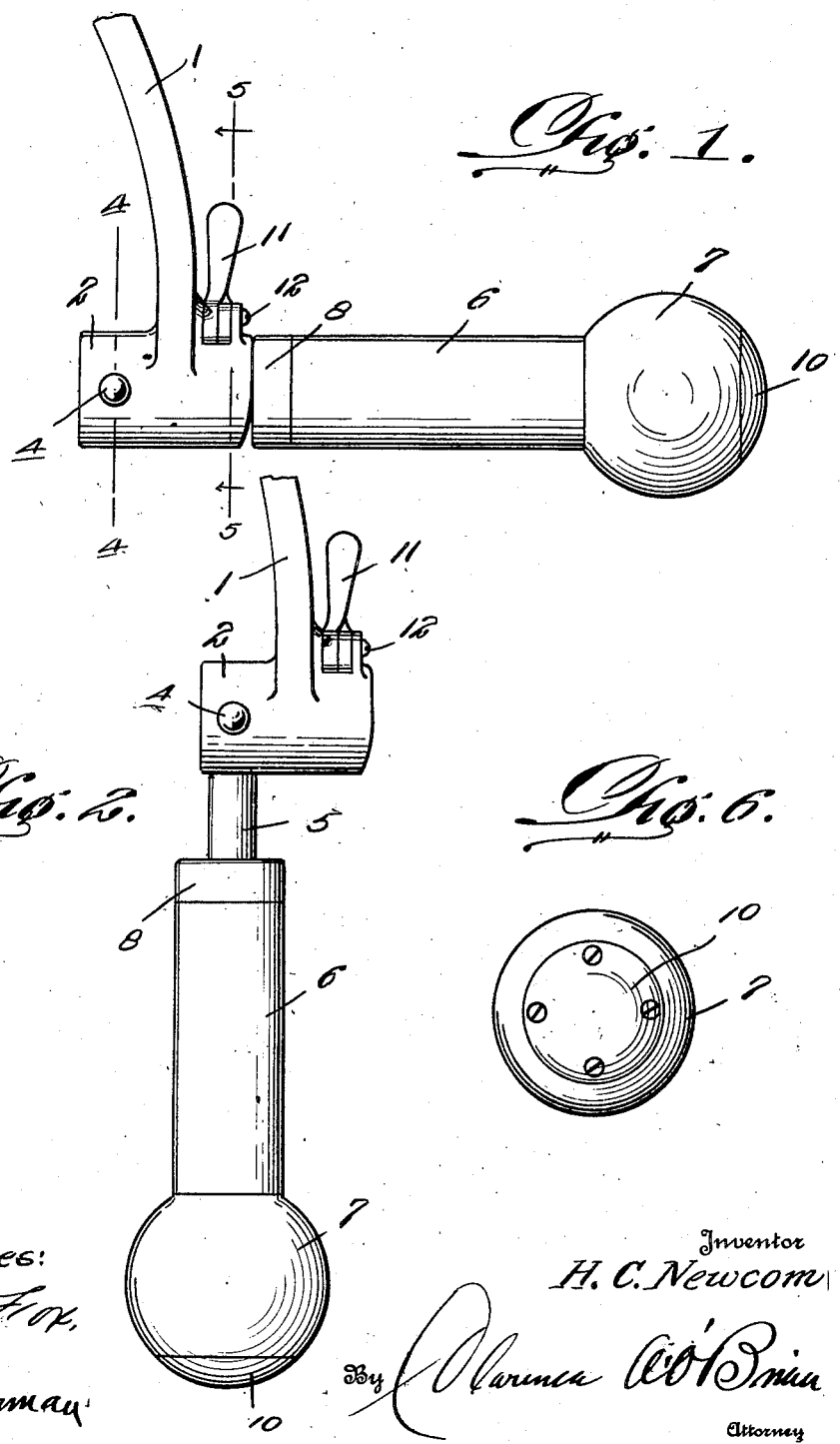

Dec. 19, 1922. 1,439,018.
H. C. NEWCOM.
CRANK HANDLE.
FILED MAY 23, 1922. 2 SHEETS—SHEET 2.
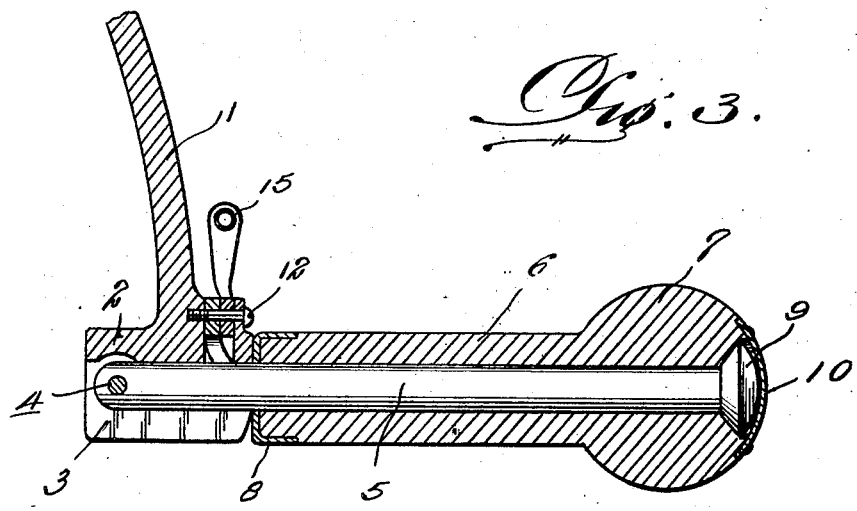
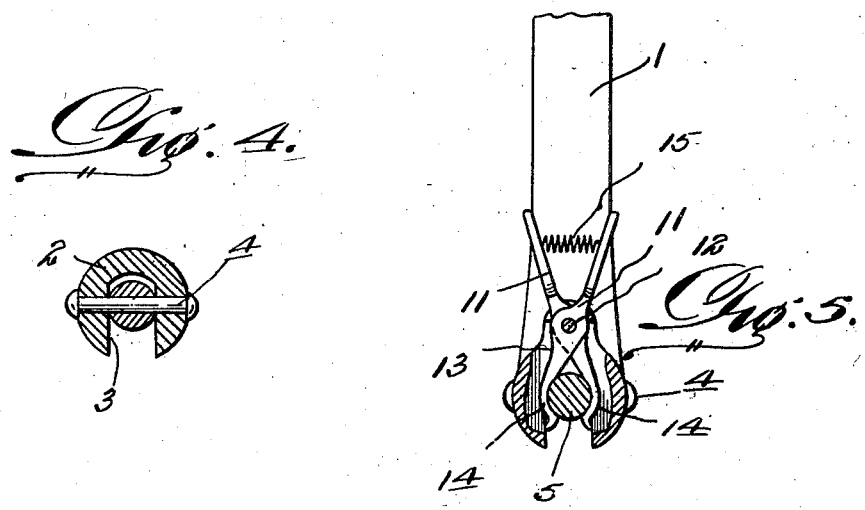
Witnesses:
Inventor
H. C. Newcom
By Clarence A. O'Brien
Attorney Patented Dec. 19, 1922.

1,439,018

UNITED STATES PATENT OFFICE.

HARVEY C. NEWCOM, OF GREGORY, SOUTH DAKOTA.

CRANK HANDLE.

Application filed May 23, 1922. Serial No. 563,157.

*To all whom it may concern:*

Be it known that I, HARVEY C. NEWCOM, a citizen of the United States, residing at Gregory, in the county of Gregory and State of South Dakota, have invented new and useful Improvements in Crank Handles, of which the following is a specification.

In carrying out the present invention it is my purpose to provide a crank handle which will be found especially useful in connection with the cranks used on hand operated churns, washing machines, automobiles, etc., and wherein the handle will be so connected with the crank arm that said handle may be readily and conveniently swung into and out of the way position, when the same is not in use, thereby minimizing the possibility of anyone accidentally striking the crank handle and injuring themselves.

It is also my purpose to improve and simplify the general construction of crank handles of the class described and to provide a crank handle which may be manufactured and marketed at small cost and which will embody comparatively few parts and these so arranged and corelated as to reduce the possibility of derangement to a minimum.

With the above recited objects in view, and others of a like nature, the invention resides in the construction, combination and arrangement of parts set forth in and falling within the scope of the appended claim.

In the accompanying drawings:

Figure 1 is a side elevation showing my improved crank handle in active position.

Figure 2 is a similar view showing the crank handle swung to inactive position.

Figure 3 is a longitudinal sectional view through the lower portion of the crank arm and the crank handle connected thereto.

Figure 4 is a similar view on the line 4—4 of Figure 1.

Figure 5 is a like view on the line 5—5 of Figure 1.

Figure 6 is an end view looking along the handle.

Referring now to the drawings in detail, 1 designates the handle and portion of the crank arm. In accordance with my invention this end portion of the crank arm is formed with a collar 2 arranged at right angles to the arm 1 and formed with a longitudinal slot 3 opening onto the outer face of the collar opposite from the handle 1. Extending across the slot 3 in the collar 2 adjacent to one end of such slot is a pivot bolt or pin 4, and pivoted upon such pin is one end of a bar 5 adapted to be arranged in a position at right angles to the arm 1, so as to form a crank handle by which the arm may be turned, as illustrated in Figure 1 of the drawings, and capable of swinging movement to the position corresponding to the position of the arm 1, as shown in Figure 2 of the drawings, so that the handle may be disposed in an out of the way position when not in use.

In the present instance, the bar 5 beyond the collar 2 is encased by a hand grip 6 circular in cross section and having its outer end formed with a ball-like portion 7 and its inner end provided with a ferrule 8. The ball-like portion 7 is countersunk on its outer end to receive the head 9 of the handle bar 5, the ball-like portion carrying a cover plate 10 that encases the head 9 to prevent dirt, grit and other foreign matter from entering the bore of the grip 6. Thus the grip and the ball-like portion 7 thereof are free to rotate about the bar 5 in the rotation of the crank when the handle is in active position, as in Figure 3.

In order to hold the handle member in active position I employ levers 11—11 pivoted to each other scissors-fashion upon a bolt 12 carried by the end portion of the collar 2 remote from the bolt 4. These levers extend through a slot 13 formed in the collar and the confronting edges on the inner ends thereof are rounded to provide jaws 14 adapted to receive and hold the bar 5, as clearly shown in Figures 3 and 5 of the drawings, while the outer ends of the levers 11 are connected to the terminals of a coiled contractile spring 15 that acts to draw the outer ends of the levers together, so that the jaws 14 will be normally in a position to receive and hold the bar 5.

When it is desired to release the bar the levers are swung apart about the pivot bolt 12 against the action of the spring 15, thereby permitting the handle member to drop in active position, as shown in Figure 1, to inactive position, as shown in Figure 2.

While I have herein shown and described one preferred form of my invention by way of illustration, I wish it to be understood that I do not limit or confine myself to the precise details of construction herein shown and described, as modifications and variations may be made within the scope of the claim and without departing from the spirit of my invention.

Having thus described the invention, what is claimed as new, is:—

The combination with a crank arm, a collar formed on the lower end of said arm arranged at right angles thereto formed with a longitudinally extending slot opening onto the outer surface thereof, a pivot bolt extending across the slot in said collar, a handle member having one end pivoted upon said bolt and adapted for swinging movement to a position at right angles to the crank arm and to a position in substantially the same plane as the crank arm, means carried by said collar for holding said handle member in active position, said means comprising levers pivotally connected to each other scissors-fashion carried by said collar and formed to provide jaws engageable with said handle member and a spring connected to said levers and acting to hold said jaws in handle engaging position.

In testimony whereof I affix my signature.

HARVEY C. NEWCOM.